P. A. E. SCHEER.
MOLD FOR MAKING CIGAR BUNCHES.
APPLICATION FILED MAY 28, 1908.

949,845.

Patented Feb. 22, 1910.
2 SHEETS—SHEET 1.

WITNESSES
W. P. Burk
W. J. Smith

INVENTOR
Peter August Eduard Scheer
ATTY.

P. A. E. SCHEER.
MOLD FOR MAKING CIGAR BUNCHES.
APPLICATION FILED MAY 28, 1908.
949,845.
Patented Feb. 22, 1910.
2 SHEETS—SHEET 2.
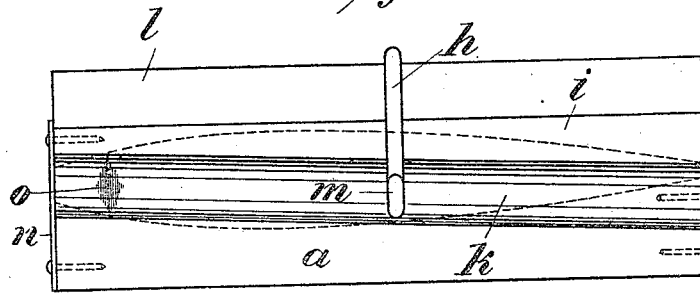
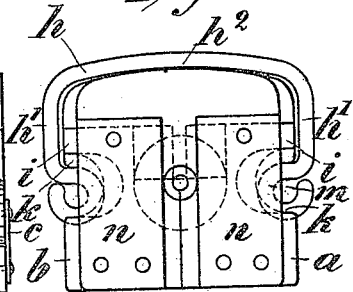
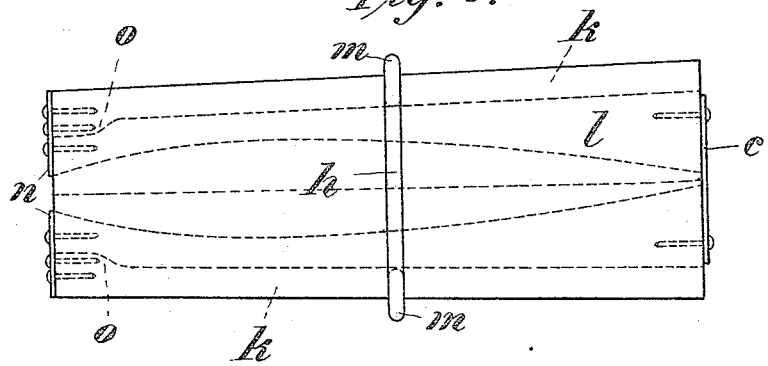
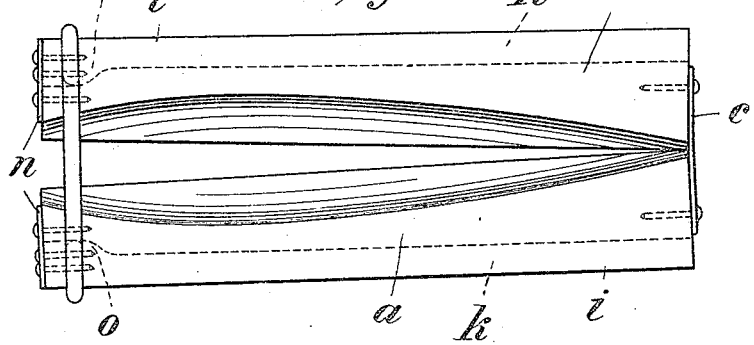
WITNESSES
W. P. Burke
W. J. Smith
INVENTOR
Peter August Eduard Scheer

UNITED STATES PATENT OFFICE.

PETER AUGUST EDUARD SCHEER, OF HAMBURG, GERMANY.

MOLD FOR MAKING CIGAR-BUNCHES.

949,845.  Specification of Letters Patent.  Patented Feb. 22, 1910.

Application filed May 28, 1908. Serial No. 435,572.

*To all whom it may concern:*

Be it known that I, PETER AUGUST EDUARD SCHEER, a citizen and resident of the city of Hamburg, in the German Empire, have invented certain new and useful Improvements in Molds for Making Cigar-Bunches, of which the following is a specification.

This invention relates to molds for making cigar-bunches and more particularly to sectional molds of this kind, consisting of an upper mold and a two-part under or lower mold.

The two sections of the lower mold are connected by a spring-link, which has the advantage that a single device only is necessary to hold the three sections of the mold together. The lower mold is provided with longitudinal ledges at its sides. Either of these ledges or the said mold itself are broader at one end than at the other, so as to obtain diverging vertical faces. Also the upper surface of the upper mold diverges relatively to the under surfaces of the ledges toward the same said end of the mold. Thus by applying a suitably shaped yoke at the narrow end of the mold and moving it toward the broader end both sections of the lower or under mold are pressed together and the upper mold is pressed against the under mold. Means may be provided for to hold the yoke on the under form also when in open position.

In the accompanying drawings similar letters refer to similar parts.

Figure 1:
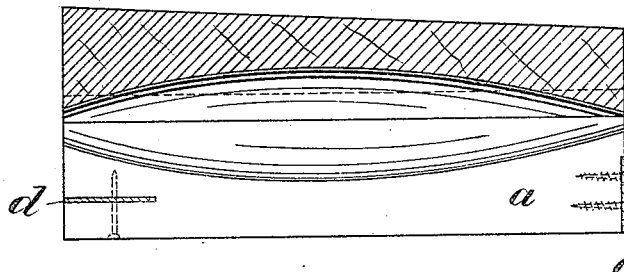
Figure 2:
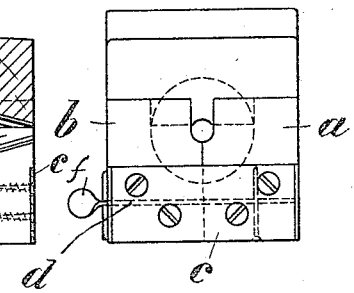
Figure 3:
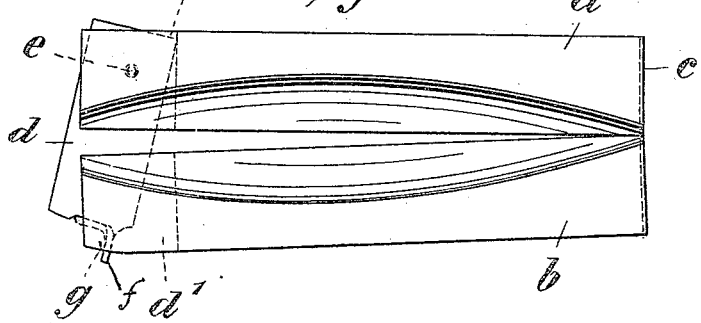
Figure 4:
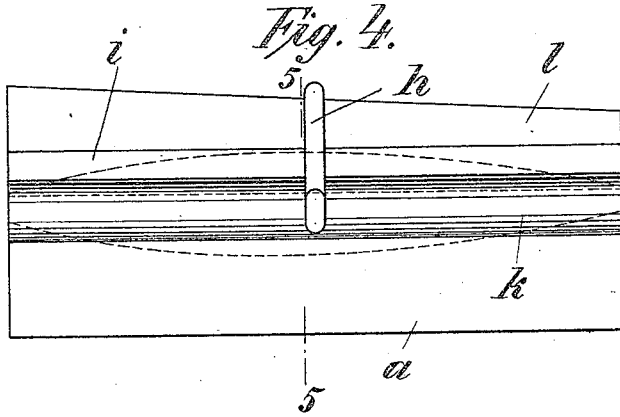
Figure 5:
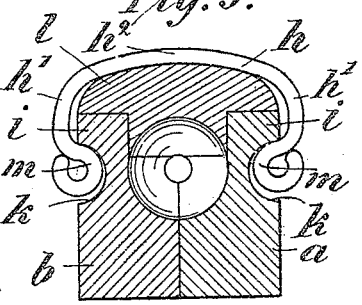

Figure 1 is a longitudinal section of a bunch mold provided with a spring link. Fig. 2 is an end view of the same. Fig. 3 shows the lower mold in open position in plan. Fig. 4 shows a bunch mold having a yoke for locking the mold in elevation. Fig. 5 is a section drawn to a line 5—5 of Fig. 4. Fig. 6 shows a bunch mold in closed position with means to hold the yoke on the under mold. Fig. 7 shows the same mold in end view, and Fig. 8 is a plan view thereof. Fig. 9 is a plan of the under mold in open position.

In the molds shown in Figs. 1-3 and 6-9 both sections $a$ and $b$ of the under mold are connected at one end by a transversely arranged spring $c$, which may be attached to the mold by screws or other means and serves as a link. This spring is so constructed as to have the tendency to bend when held in a straight position, that is, when the mold is closed, thus said spring normally tends to open out the sections $a$ and $b$ into the position shown in Figs. 3 and 9, and so acts as a spring link. For holding these two sections closed, in the mold shown in Figs. 1-3 a latch $d$ is provided for, which is pivoted to one section $a$ of the under mold at $e$ and catches into slits $d^1$ in both sections $a$ and $b$. This latch has an arm $f$ on its outmost end, to catch hold of the longitudinal side surface of the section $b$, when the mold is closed. Close to the spot where the arm $f$ holds the section $b$, the latter is provided with a small indentation $g$, into which the arm $f$ may project, when the latch is turned outward for a short distance and the sections $a$ and $b$ open out under the tension of the spring $c$ as is shown in Fig. 3.

In the modification shown in Figs. 4 and 5 a yoke $h$ is employed to replace the latch $d$, the outer surfaces of the mold corresponding to a certain degree to the shape of the yoke, in such a way that the latter is adapted to hold all three sections of the mold together. To this end the two sections $a$ and $b$ of the under mold carry longitudinal ledges $i$, which, in the modification shown, are formed by cutting longitudinal channels $k$ into the sides of the mold. As shown in Figs. 3, 8 and 9 the mold is broader at its hinder end than at its front end and the upper mold or cover $l$ is higher at the broad end of the mold than at the narrow end. The yoke $h$ is so shaped, that the ends $m$ of the prongs $h^1$ can catch under the ledges $f$, while the web $h^2$ of the yoke may contact with the upper face of the cover. In applying the yoke to the mold and shifting it toward its broader end the ends $m$ of the yoke prongs $h^1$ being rounded off bear against the side surfaces of the lower mold and therefore press these sections close together. At the same time those parts of the ends $m$ which catch under the ledges $i$, bear against these ledges from below and the web $h^2$ of the yoke bears against the top surface of the cover thus insuring a tight closure of the cover against the under mold. Instead of making the cover with a top surface rising toward the hinder end, the ledges $i$ may be made to slope downward toward this end of the mold. The main point is this, that the top surface of the upper mold and the under surface of the ledges of the lower mold diverge. In the same way the ledges themselves may diverge instead of the side faces of the lower mold, in which instance the yoke prongs $h^1$ will not bear with their lower ends $m$ against the mold but with a part higher up. The ledges $i$ need not be attached to the under mold at its upper part, but may be arranged lower down. Moreover the ledges $i$ need not have the same length as the mold as long as they are sufficiently long to insure a good pressure when the yoke is shifted along them. Preferably the cover is rounded off on top or shaped similar to a roof, but care should be taken to place the ridge along the center line, so as to distribute the pressure evenly to both sides. When the cover is flat on top, it is advisable to give the web of the yoke an inward bend, (not shown) so as to insure that the pressure acts in the longitudinal center line of the cover. The yoke may even in other respects have a shape different to the one shown. In order to prevent the yoke $i$ from being slipped off from the mold, when the same is opened, the under mold is provided with small plates $n$ at the end, of such breadth, as to serve as a stop for the yoke and thus prevent it from being taken or falling off. In the modification shown in Figs. 6–9 notches $o$ are provided for on the narrow end of the lower mold at the height of the ends $m$ of the yoke prongs $h^1$. Thus, when the under mold is held in an open position by the spring link $c$, Fig. 4, to such an extent that the bunch may be taken out from the mold the ends $m$ of the yoke catch into the notches $o$. The plates $n$ are preferably of such height, as to project above the under mold and serve as a stop for the upper mold, so as to insure the latter of being always placed in the same position relatively to the under mold. The plates $n$ may be replaced by other means to act as a stop for the yoke, such as a pin, projection, stud or the like. By these means the yoke will always remain in connection with the under mold, when the complete bunch mold is opened to take out the filler or bunch. This has the advantage that the yoke cannot become lost and that it need not be searched for, nor need it be taken up from some other place when the mold is to be closed.

I claim:

1. A sectional mold for cigar bunches consisting of a two part under mold and an upper mold, a spring link connecting the sections of the under mold elastically and means to hold the sections together, when the mold is closed.

2. A sectional mold for cigar bunches consisting of a two part under mold and an upper mold in combination with a yoke longitudinally movable on the mold, faces on the mold, with which the yoke may contact, diverging toward one end of the mold, so as to press the sections of the mold together when the yoke is moved toward one end and to release the sections, when it is moved to the other end of the mold.

3. A sectional mold for cigar bunches consisting of a two part under mold and an upper mold in combination with a yoke movable on the mold in longitudinal direction, ledges on the under mold, under which the ends of the yoke prongs may catch, faces on the mold, with which the yoke may contact, diverging toward one end of the mold, so as to press the sections of the mold together, when the yoke is moved toward one end and to release them, when it is moved to the other end of the mold.

4. A sectional mold for cigar bunches consisting of a two part under mold and an upper mold in combination with a yoke movable on the mold longitudinally and adapted to partly surround the mold, and with ledges on the under mold diverging with respect to one another and to the upper surface of the upper mold toward one end of the mold, for the purpose set forth.

5. A sectional mold consisting of a two part under mold and an upper mold in combination with a yoke adapted to partly surround the mold and to be moved along the same in longitudinal direction, ledges on the under mold having diverging faces and other faces diverging with regard to the upper surface of the upper mold, the last named surface having a raised center part.

6. A sectional mold consisting of a two part under mold and an upper mold ledges on the under mold in combination with a yoke adapted to be moved along the mold longitudinally and to catch under the ledges with the ends of its prongs, the ledges being formed by cutting channels in the side face of the under mold, the faces of the mold with which the yoke contacts diverging toward one end of the mold for the purpose set forth.

7. A sectional mold consisting of a two part under mold and an upper mold, a spring link at the hinder end of the under mold to connect the sections of the latter elastically and notches in the side of the under mold at the front end, in combination with a yoke adapted to be moved along the mold and to catch into the notches with the ends of its prongs, when moved to the front end of the mold, so as to enable an automatic opening of the under mold by aid of the spring link.

8. A sectional mold for cigar bunches consisting of a two part under mold and an upper mold, a spring link at the hinder end of the under mold, to connect its parts elastically and notches in the sides of the under mold at the front end, in combination with a yoke, adapted to be moved longitudinally on the mold, and to catch into the notches with the ends of its prongs, the faces on the mold, with which the yoke contacts, diverging toward one end of the mold, in further combination with stops to prevent the yoke to be removed from the under-mold.

9. A sectional mold for cigar bunches consisting of a two part under mold and an upper mold, a spring link at the hinder end of the under mold, to connect its parts elastically and notches in the sides of the under mold at the front end, in combination with a yoke, adapted to be moved longitudinally on the mold, and to catch into the notches with the ends of its prongs, the faces on the mold, with which the yoke contacts, diverging toward one end of the mold, in further combination with plates acting as stops to prevent the yoke to be removed from the under mold.

10. A sectional mold for cigar bunches consisting of a two part under mold and an upper mold, a spring link at the hinder end of the under mold, to connect its parts elastically and notches in the sides of the under mold at the front end, in combination with a yoke, adapted to be moved longitudinally on the mold, and to catch into the notches with the ends of its prongs, the faces on the mold, with which the yoke contacts, diverging toward one end of the mold, in further combination with plates acting as stops to prevent the yoke to be removed from the under mold, and projecting over the top of the under mold, so as to serve also as a stop for the upper mold to properly situate the latter.

PETER AUGUST EDUARD SCHEER.

Witnesses:
 JEAN GRUND,
 CARL GRUND.